May 29, 1962  R. K. SCHLOSSER, JR  3,036,666
HAND BRAKE RIGGING
Filed March 19, 1958
2 Sheets-Sheet 2
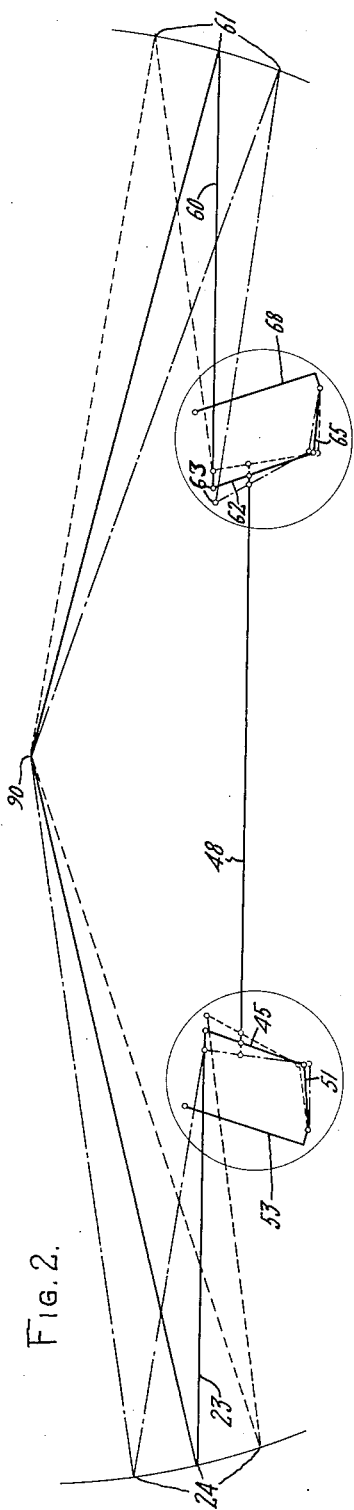
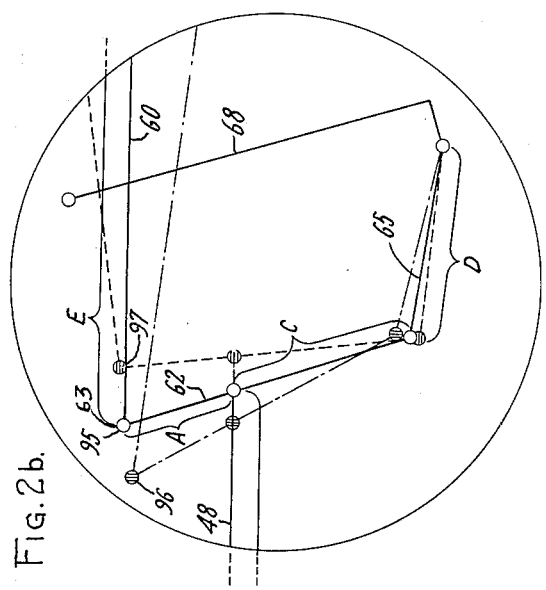
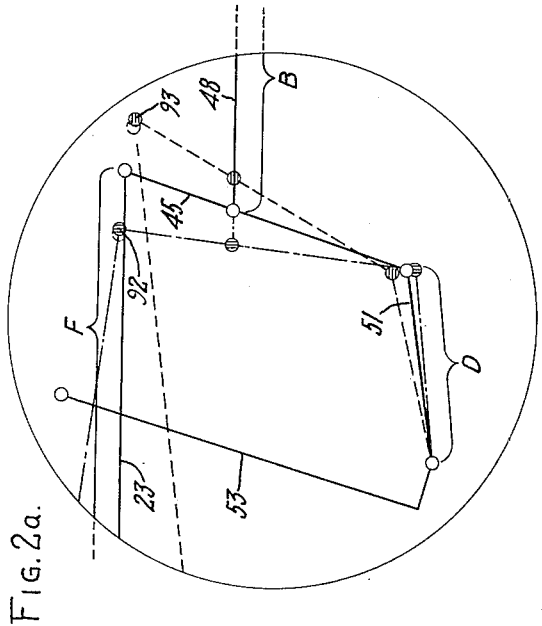
INVENTOR:
RUSSELL K. SCHLOSSER, JR.
BY David P. Ogden
HIS ATTORNEY

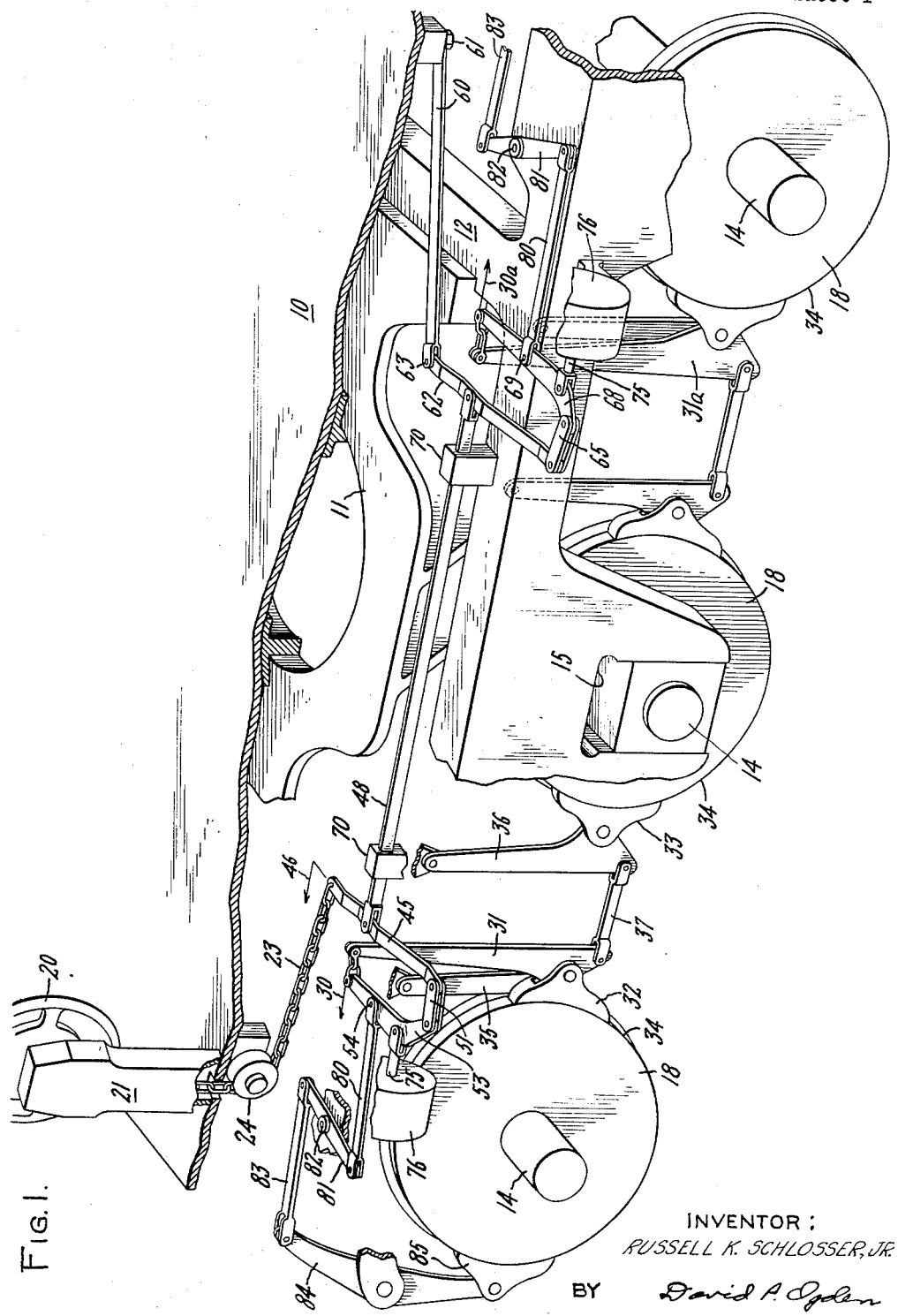

United States Patent Office 3,036,666
Patented May 29, 1962

3,036,666
HAND BRAKE RIGGING
Russell K. Schlosser, Jr., Erie, Pa., assignor to General Electric Company, a corporation of New York
Filed Mar. 19, 1958, Ser. No. 722,463
4 Claims. (Cl. 188—46)

This invention relates to hand brake rigging and, more particularly, to a hand brake rigging which will apply a substantially uniform braking force to the brake shoes of a locomotive regardless of relative rotation between the locomotive bedplate and the truck occurring during negotiation of curved track.

For many years, hand brakes have been used in rail vehicles such as locomotives to maintain the vehicles in a given location once they are stopped. Also, under emergency conditions, the hand brakes will retard a moving vehicle. However, it invariably occurs that the hand brake wheel is located on the platform of the body of the vehicle while the brakes themselves are located on the truck under the vehicle. Since the release of the hand brakes may be accomplished by providing a fraction of an inch slack in the hand brake rigging and since it is often desirable to utilize the hand brakes, in the absence of air pressure, as an emergency brake to stop the vehicles, it is essential to have a rigging between the hand brake wheel and the brake shoe linkage which will be unaffected by relative rotation by the truck and the body experienced during entrance or exit from a curved piece of track. Without such an arrangement, the movement over the curved track and resulting relative rotation will change the effective distance between the hand wheel and the brake shoes to either partially release the brakes or increase the tension of the brake rigging and linkage. Release of the brakes can be compensated for by rapid movement of the hand wheel. However, increased tension, even when the brakes have been released, is likely to cause a rupture in the hand brake rigging.

In the past, several rather complicated linkage mechanisms have been devised in attempts to compensate for such tension variation. Usually such a rigging was usable only with a truck where the linkage could be connected to the truck effectively at its center line. However, such connection is not feasible with a 3-axle locomotive truck where a bolster spans the center of the truck and traction motors, etc., fill substantially all of the space at the center line of thet ruck.

Therefore, an object of my invention is to provide a simple and reliable hand brake rigging which will be substantially unaffected by relative rotation between the rail vehicle frame and the truck.

Briefly, in accordance with one aspect of my invention, a hand wheel is mounted on the frame of the locomotive supported on a pivotable truck. The hand brake rigging conducts a braking force from the hand wheel to the brake linkage which actautes the braking shoes of the truck. Both ends of the rigging are secured to the frame to insure substantially uniform tension within the linkage when the brake shoes are actuated by the hand brake rigging regardless of the relative rotation of the truck.

The subject matter which I regard as my invention is particularly pointed out and distinctly claimed in the concluding portion of this specification. My invention, however, as to its organization and method of operation together with further objects and advantages thereof will best be understood by reference to the following description taken in connection with the accompanying drawing, in which:

FIG. 1 is a perspective view partially in section of one end of the locomotive illustrating a truck having the linkage of my invention;

FIG. 2 is a line diagram illustrating the effect on the hand brake and the brake rigging of my invention of relative rotation of the truck; and FIGS. 2a, and 2b are enlarged views of portions of the line diagram of FIGURE 2.

Referring now to the drawing, in which like numbers refer to similar parts, in FIG. 1, I have shown one end of a locomotive frame 10 which is pivotably supported on a bolster 11 spanning the space between two transverse members of a truck 12. Three axles as illustrated at 14 are mounted in the journal box cavities 15 to support the truck on the wheels 18. Usually, with a 3-axle truck of this construction, each of the axles 14 will be substantially surrounded by a traction motor (not shown). Obviously with such traction motors, the bolster 11 and other elements such as couplers, etc. (not shown), it is not feasible to attempt to provide clearance for the hand brake rigging through the axial center of the truck 12.

In the hand brake rigging art, a hand wheel 20 is mounted on a standard 21 and drivingly connected to a pulley arrangement well known in the railroad art to apply tension or braking force to a flexible link or chain 23. If it is necessary or desirable only to apply tension to a chain 23 along one side of the locomotive to apply a braking force to the wheels on one side of a truck, the handwheel 20 will be mounted on one side of the locomotive (not shown). However, it is feasible to use hand brake chains on each side of the locomotive. In order to align the braking force vector created by the hand wheel 20 to a longitudinal direction in the chain 23 to the linking mechanism, a pulley wheel 24 is provided. Obviously, other link arrangements could be used for slightly varying braking linkages.

It is apparent from FIG. 1 that the complete hand brake rigging and brake linkage is relatively complicated. Therefore, I will start my discussion by explaining the effect on the brake linkage of a braking force. An arrow 30 indicates the desired braking force vector to be applied to the upper end of a lever 31 for causing the brake shoes 32 and 33 to engage the running surfaces 34 of the wheels 18. It should be noted that the brake shoe 32 is supported by a pair of hangers (one shown at 35) which are in turn pivotably supported on a portion of the truck 12. Similarly, the brake shoe 33 is supported by a lever 36, pivotably supported from the truck frame.

During any braking operation, a braking force in the direction of the vector 30, applied to the lever 31, will cause the lever 31 to move the brake shoe 32 in a direction to cause braking engagement of the associated wheel surface 34. At the same time, a counteracting force will be applied to compress a link 37 to cause a similar force to be applied through the lever 36 to the brake shoe 33. It should be noted that this compression in the link 37 is effectively applied to both brake shoes 32 and 33. Thus the linkage leverage may be designed to apply equal braking pressures to both brake shoes 32 and 33.

According to my invention, I have shown a simplified arrangement of the hand brake rigging for applying the force 30 to the top of the lever 31. The end of the chain 23 is secured to a hand brake lever 45 in a manner to apply a braking force vector 46 as shown. This will cause the lever 45 to apply a reaction force vector to a rod 48 and a force to a link 51. The link 51 applies its reactive force to a cylinder lever 53 (pivotably secured at 54) in a direction which will apply the braking force vector 30 to the lever 31.

At the other end of the truck 12 similar braking action is occurring in a brake rigging substantially similar and complementary in elemental configuration and operation to the left hand end of the truck. A link or rod 60 is secured to a pivot point 61 on the platform 10 of the locomotive so that it may not be moved by the tension applied to the rod 48. In other words, movement of the chain 23 in response to the force 46 can not move the rod 60 and must cause tension in the rod 48. Thus, a hand brake lever 62 is pivotably secured to the rod 60 at a point 63 and the tension in the rod 48 will cause a force, substantially equal to the force applied to the link 51 but in an opposite direction, to be applied to a link 65. This force causes rotation of a cylinder lever 68 about its pivotal support point 69 to apply a braking force vector 30a similar to the force vector 30 to a lever 31a functionally similar to lever 31 but reversed because of its location at the opposite end of the truck 12. Obviously, the reactions to force vector 30a may be envisioned clearly by a mirror copy of that discussed in connection with parts 31—37.

In the prior art structures, the link 62 has been pivotably secured to the truck 12 so that rotation of the truck 12 about the center line of the bolster 11 would cause sufficient movement within the hand brake rigging to cause a slack variation of plus or minus three inches. With such a connection when the hand brake rigging was released with the locomotive on a straight track, movement of the locomotive from one track to another would often break the chain 23. This could occur with as much as 2 inches slack at the time of releasing the hand brakes. If the brakes were released while the locomotive was on a curved track, the necessary slack to prevent chain breakage could be as much as 5 inches.

However, I have found that by connecting the pivot point 63 to the frame 10 (at the pivot point 61), I am able to limit the slack variation of the hand brake rigging to plus or minus ¼ inch. Once the pivot point 63 has been secured to the frame, the slack variation of a fraction of an inch may be designed to be very small by making the distance between the pulley 24 and the link 45 as long as practicable and equal to the length of the link 60. Also, the distances between the respective pivot points of these links and the center line of the bolster 11 may be balanced to substantially eliminate any slack variation. However, a slack variation of one quarter inch is satisfactory for most applications and further refinement would necessitate substantial relocation of various other components on the truck. Although the advantages of reducing the slack variation from ±3 inches to ±¼ inch are obvious, the economic considerations involved do not appear to warrant reduction of the ±¼ inch by substantial redesign of the truck 12.

In order to prevent motion of the rod 48 other than desired longitudinal motion, it is secured to the truck 12 by a sliding journal connection such as the blocks 70 having journal openings therethrough. It should also be noted that with respect to the forces applied by the links 23 and 60 to the levers 45 and 62, the rod 48 may be referred to as establishing the fulcrum of rotation.

It now becomes obvious that according to my invention tension of the chain 23 applied to the lever 45 will cause reacting forces in the rod 48 and the link 51. This force in the rod 48 will be transmitted to the lever 62 and from there to the link 65 and the rod 60. Since the rod 60 is secured to the pivot point 61 on the locomotive frame 10, tension in the rod 60 will not cause any substantial longitudinal movement thereof with respect to the frame 10.

Thus, the link 65 will be rotated to receive a braking force by movement of the rod 48. This force will cause a lever 68 to move and apply the braking force 30a to the lever 31a and apply the brakes at the right hand end of the truck.

It should be noted that the described movement of the levers 53 and 68 will also move a rod 75 which is secured thereto and which rod passes into and is operable by an air brake device 76. The air brake device 76 is secured to the truck 12. Thus, the brake linkage used to apply air brakes is also used to apply the tension created in the hand brake rigging parts 23, 45, 48, 62 and 60 of my invention.

In the particular construction of brake linkage shown in FIG. 1, the pivotal points 54 and 69 are not secured directly to the truck 12. Instead, these points are each pivotably secured to a link 80 which is drivingly connected to a lever 81. The lever 81 is pivotally mounted on the truck 12 at the point 82 to apply braking force to a link 83 and a lever 84 (pivoted on the truck 12) supporting a brake shoe 85 in a manner to cause engagement between the brake shoe 85 and the surface of the wheel nearest the end of the truck. It should be noted that by using floating fulcrums and preselected leverages, the tension in the link 80 will cause engagement of the brake shoe 85 only when the braking force is applied to the brake shoes 32 and 33. The leverage of this linkage 80—85 is designed to apply a brake shoe pressure to this surface, which is substantially equal to the brake shoe pressure at all other wheel surfaces.

It is obvious that the brake linkage arrangement 31—37 and 80—85 shown will cause engagement by the brake shoes 32, 33 and 85 of both leading and trailing surfaces of each of the three wheels 18 on the one side of the truck 12. It should be noted that when no force 46 is applied by the chain 23, application of air pressure to both air brake devices 76 will cause compression in the brake linkage to apply a braking force to the brake shoes but will not cause tension in the rod 48 because of the freedom of movement of the lever 45. However, with either air pressure operation or hand brake rigging operation, the braking force is applied to all brake shoes.

It will become obvious from the following discussion of FIG. 2 that, according to my invention, normal longitudinal movement of the supports 70 occasioned by truck rotation will not affect materially the tension of the chain 23 and the rod 60. Moreover, with the hand brake applied rotation of the truck will merely cause rotation of the levers 45 and 62 but will not materially affect the tension in the rod 48 and, therefore, will not release the brakes nor substantially increase the tension within the hand brake rigging. However, as pointed out above, if the pivot point 63 were secured to the truck, truck rotation would directly affect the tension in the rod 48 and might either release the brakes or break the chain 23.

Referring now to FIG. 2, I have shown a simplified diagram of the movement of the links 23, 45, 48, 51, 60, 62 and 65 during relative rotation about the center 90 of the bolster 11 between the body 10 of the locomotive and the truck 12. Although most trucks are designed to rotate relative to the locomotive body a maximum of 4°, one particular truck is designed to rotate as much as 5°. Therefore, I have illustrated a 5° rotation of the body relative to the truck.

The solid lines 23—68 of FIG. 2 indicate the center lines of the various links of my hand brake rigging when (1) the truck 12 is aligned with the body 10, and (2) the brakes are engaging slightly the brake surfaces of the wheel 18. The dot dashed lines indicate the position of the links when the body is rotated 5° clockwise relative to the truck and the dotted lines represent 5° counterclockwise rotation.

By illustrating the body 10 as rotatable about the center 90 instead of the truck 12, the drawing is simplified, partially because rod 48 has its center line aligned by the guides 70, and is movable only longitudinally.

It is obvious that the maximum length of the various steel links is fixed. Also, in FIG. 2, it is assumed that the system is perfect and the brake rigging links 53 and 68 do not move during relative rotation between the frame 10 and the truck 12. This relationship may be regulated partially by proper maintenance of the brake linkage slack adjustments (not shown). Since the distances between the ends of the rod 48 and the adjacent ends of the links 23 and 60 are fixed by the rigid links 45 and 62 respectively, these ends of the links 23 and 60 will move in an arc of a large radius depending primarily on the angle of the links 45 and 62 relative to the rod 48.

Because of the relatively complicated mathematics involved, I prefer to discuss only the major features critical to an optimum arrangement. First, it is obvious that the location of the "fixed" links 53 and 68 depend to a large extent on the particular brake rigging. For an optimum hand brake system, the location of these links 53 and 68 should be symmetrical relative to the center 90 of the bolster.

Next, I prefer to locate the outer extremities 24 and 61 of links 23 and 60 on a line parallel to the rod 48. On straight track, the links 23 and 60 are also parallel to the rod 48. The distance between pivots 24 and 61 is designed as long as practicable and the links 23 and 60 are also designed as long as practicable. It is obvious that if the links 23 and 60 were of the length as short as the links 51 and 65 their angular pivotal movement during rotation of the truck 12 would be substantially increased, as would be any error introduced by such pivotal movement.

In order to clarify the phenomena occurring in and adjacent to the links 45 and 62, portions of FIG. 2 have been enlarged in FIGS. 2a and 2b.

Since the lengths A, B, C, D, E and F of the links (45 and 62), 48, (45 and 62), (51 and 65), 60 and 23 respectively are predetermined, relative rotation between the body 10 and the truck 12 will cause the rod 48 to move longitudinally. The pivoting of the links 23 and 60 will substantially compensate (both moving in the same direction) so that the tension of the hand brake rigging will not be changed materially.

According to my invention, the combined effective longitudinal length (relative to the truck 12) of the links 23 and 60, when they are both in a parallel to the rod 48 is slightly greater than their longitudinal length when both links are slightly angled. Thus, it is apparent that there must be both theoretically and actually a small variation as indicated by the double pivotal connections 92 and 93 in FIG. 2a. This error is the versed sine of the angle between the rod 48 and the link 60 subtracted from the versed sine of the angle between the rod 48 and the link 23. However, according to my invention wherein these angles are small because of the length of the links 23 and 60 compared to the maximum relative rotation of the truck, the slight error compares very favorably to the magnitude of the required movement of the pivotal point 63 as shown in FIG. 2b by the distance between the points 95, 96 and 97, which improvement could not occur if the hand brake rigging were not secured at both ends 24 and 61 to the frame 10.

While I have illustrated and described a particular modification of my invention, other modifications will occur to those skilled in the art. For instance, other rigging may be connected between the chain 23 and the rod 60 of the rod 60 may be tensionable from the frame 10 by a second hand wheel so long as both points of application of hand brake rigging and braking force are secured to the frame 10. Moreover, my hand brake rigging may be connected to supply a braking force vector to other brake linkage arrangements. Also, if only one air pressure device were used on a truck, the force between the hand wheel 20 and the rod 60 could be transmitted to a link equivalent to link 51 by securing a link similar to link 65 to the truck 12 so that tension could be maintained in the rod 48. I intend, therefore, to cover in the appended claims all such modifications as fall within the true spirit and scope of my invention.

What I claim as new and desire to secure by Letters Patent of the United States is:

1. In combination with a rail vehicle having a frame pivotally mounted on a truck including wheel and axle assemblies: a pair of brake linkages mounted on one side of the truck adapted to transmit braking forces to the wheels of that side of the truck, the brake linkages being substantially similar and complementary in elemental configuration and operation, each brake linkage including a generally horizontal cylinder lever having inboard and outboard ends and adapted to be actuated by a power device operatively and pivotally connected to the outboard ends thereof, actuation of said cylinder lever causing actuation of the other elements of the brake linkage, said cylinder levers being located on opposite sides of the pivot mounting of the frame on said one side of the truck, a hand brake linkage for causing actuation of the brake linkages comprising, a first generally horizontal hand brake lever having inboard and outboard ends, a first link pivotally connected between the outboard end of said first hand brake lever and the outboard end of one of said cylinder levers, a second generally horizontal hand brake lever having inboard and outboard ends, a second link pivotally connected between the outboard end of said second hand brake lever and the outboard end of the other of said cylinder levers, a first rod pivotally connected between mid-portions of said first and second hand brake levers, a second rod having one end thereof pivotally connected to the inboard end of one of said hand brake levers and the other end thereof pivotally secured to the frame, hand brake linkage actuating means mounted on the frame, actuating link means pivotally connected at one end to the inboard end of the other hand brake lever and connected at the other end to the hand brake actuating means.

2. The hand brake linkage of claim 1 wherein the length of the second rod and the actuating link means are substantially greater than the length of said first and second links.

3. The hand brake linkage of claim 1 wherein the first rod is journaled through guide means secured to the truck frame and is limited by said guide means to essentially parallel movement with respect to the longitudinal axis of the truck.

4. The arrangement of claim 1 wherein the point at which the second rod is pivoted to the frame and the connection of said actuating link means to the hand brake actuating means are on opposite sides of said pivot mounting of said frame with respect to said one truck side and define a straight line parallel to the longitudinal axis of the truck.

References Cited in the file of this patent

UNITED STATES PATENTS

| | | |
|---|---|---|
| 714,236 | Posson | Nov. 25, 1902 |
| 1,097,305 | Doan | May 19, 1914 |
| 1,156,490 | Pilcher | Oct. 12, 1915 |
| 2,135,121 | Baselt | Nov. 1, 1938 |
| 2,371,182 | Orr et al. | Mar. 13, 1945 |
| 2,657,771 | Schettler | Nov. 3, 1953 |
| 2,686,575 | Bunker | Aug. 17, 1954 |
| 2,940,546 | Postma | June 14, 1960 |
| 2,955,679 | Herbert | Oct. 11, 1960 |